(12) United States Patent
Tierno et al.

(10) Patent No.: US 11,757,681 B1
(45) Date of Patent: Sep. 12, 2023

(54) SERIAL DATA RECEIVER CIRCUIT WITH DITHER ASSISTED EQUALIZATION

(71) Applicant: Apple Inc., Cupertino, CA (US)

(72) Inventors: Jose A. Tierno, Menlo Park, CA (US); Haiming Jin, Cupertino, CA (US); Brian S. Leibowitz, San Francisco, CA (US); Sanjeev K. Maheshwari, Fremont, CA (US); Chintan S. Thakkar, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/934,891

(22) Filed: Sep. 23, 2022

(51) Int. Cl.
*H04L 25/03* (2006.01)

(52) U.S. Cl.
CPC .. *H04L 25/03057* (2013.01); *H04L 25/03885* (2013.01)

(58) Field of Classification Search
CPC ............... H04L 25/026; H04L 25/0264; H04L 25/03006; H04L 25/03019; H04L 25/03057; H04L 25/03076; H04L 25/03878; H04L 25/03885

USPC ........ 375/229, 232, 233, 326, 346, 348, 350
See application file for complete search history.

(56) References Cited

U.S. PATENT DOCUMENTS

| | | | |
|---|---|---|---|
| 9,294,314 B2 | 3/2016 | Mobin et al. | |
| 9,438,450 B1* | 9/2016 | Kang | H04L 25/03057 |
| 10,084,591 B1 | 9/2018 | Palusa et al. | |
| 10,181,941 B1* | 1/2019 | Chen | H04L 7/0062 |
| 10,491,365 B1 | 11/2019 | Lin | |
| 10,523,472 B1* | 12/2019 | Zhao | H04L 25/0328 |
| 2017/0005785 A1* | 1/2017 | Aleksic | H04L 7/033 |

* cited by examiner

*Primary Examiner* — Young T. Tse
(74) *Attorney, Agent, or Firm* — Kowert, Hood, Munyon, Rankin & Goetzel, P.C.; Dean M. Munyon

(57) ABSTRACT

To compensate for intersymbol interference, a serial data receiver circuit included in a computer system may include an equalizer circuit that includes a digital-to-analog converter circuit. Based on previously received symbols, the equalizer circuit modifies a signal received via a communication channel or link prior to clock and data recovery. In cases when the digital-to-analog converter circuit becomes saturated, the equalizer circuit additionally uses a dither signal to modify the received signal.

20 Claims, 12 Drawing Sheets

SERIAL DATA RECEIVER CIRCUIT WITH DITHER ASSISTED EQUALIZATION

BACKGROUND

Technical Field

This disclosure relates to the field of high-speed communication interface design and, in particular, to serial receiver circuit equalization for a low-loss communication channel.

Description of the Related Art

Computing systems typically include a number of interconnected integrated circuits. In some cases, the integrated circuits may communicate using communication channels or links to transmit and receive data bits. The communication channels may support parallel communication, in which multiple data bits are transmitted in parallel, or serial communication, in which data bits are transmitted one bit at a time in a serial fashion.

The data transmitted between integrated circuits may be encoded to aid in transmission. For example, in the case of serial communication, data may be encoded to provide sufficient transitions between logic states to allow for clock and data recovery circuits to operate. Alternatively, in the case of parallel communication, the data may be encoded to reduce switching noise or to improve signal integrity.

During transmission of data, the physical characteristics of the communication channel may attenuate a transmitted signal associated with a particular data bit. For example, the impedance of wiring included in the communication channel or link may attenuate certain frequency ranges of the transmitted signal. Additionally, impedance mismatches between wiring included in the communication channel and devices coupled to the communication channel may induce reflections of the transmitted signal, which may degrade subsequently transmitted signals corresponding to other data bits.

Figure 1:
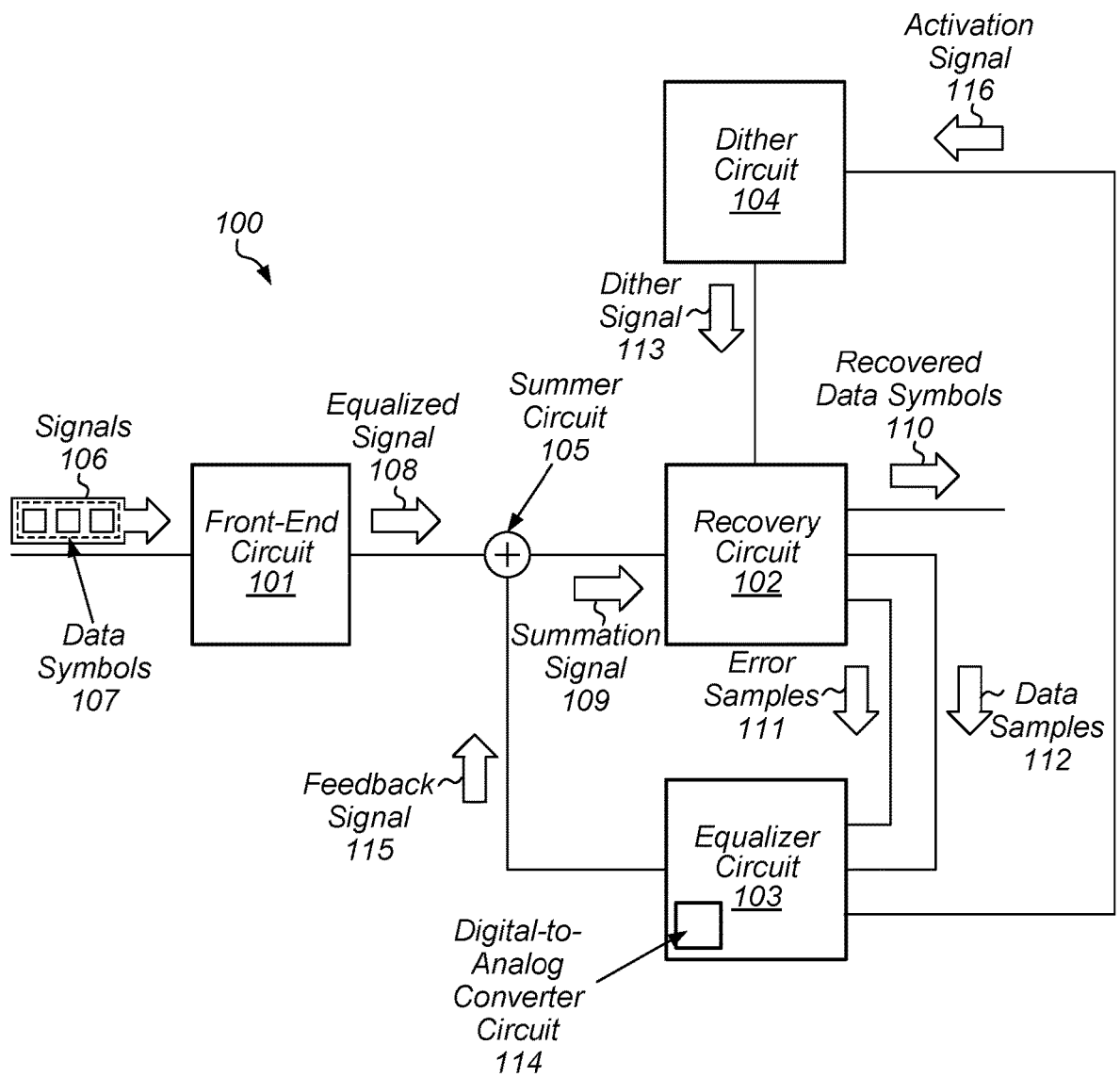
FIG. 1 is a block diagram of an embodiment of a receiver circuit for a computer system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed but, on the contrary, the intention is to cover all modifications, equivalents and alternatives falling within the spirit and scope of the appended claims.

DETAILED DESCRIPTION OF EMBODIMENTS

A computing system may include one or more integrated circuits, such as, e.g., a central processing unit (CPU) and memories. Various integrated circuits of the computing system may communicate through either a serial or parallel interface. In a parallel interface, multiple data bits are communicated simultaneously, while in a serial interface, data is communicated as a series of sequential single data bits. When employing a serial interface to communicate data between two devices included in a computing system, the data may be transmitted according to different protocols. For example, the data may be transmitted using a return to zero (RZ) protocol, non-return to zero (NRZ) protocol, pulse amplitude modulation (PAM), or any suitable combination thereof.

When employing serial data transfer techniques, serializer and deserializer (SERDES) circuits can be employed to convert multi-bit words of data into a stream of data symbols for transmission, and then convert a received stream of data symbols back into the multi-bit words of data. Serial data streams can be transmitted without an accompanying clock signal, in which case a deserialization circuit can employ clock data recovery ("CDR") to extract a clock signal from the stream of data symbols, and then use the extracted clock signal to sample the stream of data symbols to recover the transmitted data.

When transmitting serial data over a channel or link, the serial data can become distorted due to the physical properties of the channel or link. Reflections, the non-linear frequency response of the channel or link, and the like, can result in a particular data symbol becoming distorted by one or more previously transmitted signals. When symbols become distorted, clock and data recovery circuits may generate erroneous results. This type of distortion is commonly referred to as intersymbol interference ("ISI").

Various techniques, such as feed-forward equalization ("FFE"), continuous time linear equalization (CTLE), and decision-feedback equalization ("DFE") may be employed to compensate for the distortion in the transmitted symbols. CTLE and DFE are the two common techniques used on the receiver side of a communication link or channel to recover the transmitted symbols from a noisy signal stream.

Typical wide-range channel equalizer circuits that are equipped with CTLE and DFE digital-to-analog (DAC) circuits have high gain centered around the frequency of transmission. This is particularly important for circuits that are designed to receive PAM3 and PAM4 encoded signals, as consecutive non-binary symbols need to cross multiple threshold levels. Such high-gain circuits, however, can cause problems when used to equalize signals transmitted over a short channel that has relatively little loss. The combination of low channel loss and high equalization gain can result in an amplitude of a sample of the received signal that exceeds the dynamic range of the DFE DAC circuit. When this occurs, the DAC circuit becomes saturated, i.e., all of the input bits to the DAC become a common logic value, and the output of the DAC does not vary, resulting in an inaccurate sampling of the received signal.

The embodiments illustrated in the drawings and described below provide techniques for reducing inaccurate sampler outputs in low-noise serial transmission scenarios. By combining a time-varying signal with signals sampled from a received signal, the resultant signal dithered across the range of an equalizer circuit's digital-to-analog converter circuit to limit saturation of the digital-to-analog circuit and reduce inaccurate sampling results.

Turning to FIG. 1, a block diagram of a serial data receiver circuit is depicted. As illustrated, receiver circuit 100 includes front-end circuit 101, recovery circuit 102, equalizer circuit 103, dither circuit 104, and summer circuit 105.

Front-end circuit 101 is configured to generate equalized signal 108 using signals 106. In various embodiments, signals 106 encode a serial data stream that includes data symbols 107. In some cases, a given one of data symbols 107 may correspond to a single bit while, in other cases, the given one of data symbols 107 may correspond to multiple bits. It is noted that although signals 106, equalized signal 108 and summation signal 109 are depicted as being propagated via a single wire or conductor, in some embodiments, the aforementioned signals may be differentially encoded using at least two wires or conductors.

Summer circuit 105 is configured to combine equalized signal 108 and feedback signal 115 to generate summation signal 109. Summer circuit 105 may be implemented in a variety of ways depending on the nature of equalized signal 108 and feedback signal 115. For example, if equalized signal 108 is a voltage and feedback signal 115 is a current, summer circuit 105 may be implemented as a circuit node to (or from) which the current of feedback signal 115 may be sourced (or sunk). In other embodiments, summer circuit 105 may be implemented as an amplifier circuit when combining two voltage signals.

Recovery circuit 102 is configured to sample summation signal 109 to generate data samples 112. Additionally, recovery circuit 102 is also configured to sample a combination of summation signal 109 and dither signal 113 to generate error samples.

Equalizer circuit 103 includes digital-to-analog converter circuit 114. In various embodiments, equalizer circuit 103 is configured to generate feedback signal 115 using data samples 112 and error samples 111. Equalizer circuit 103 may, in some embodiments, be implemented using a decision feedback equalizer circuit that uses the values of previously received symbols to determine a value for feedback signal 115 to cancel ISI with a current symbol being sampled by recovery circuit 102. Equalizer circuit 103 may, in some embodiments, include a control circuit to configure the decision feedback equalizer based on the error samples 111. Equalizer circuit 103 is also configured to generate activation signal 116 using error samples 111.

As described below, digital-to-analog converter circuit 114 may be implemented using a current steering data that generates a current corresponding to feedback signal 115. The value of feedback signal 115 may be based on one or more previously received symbols.

Dither circuit 104 is configured to generate dither signal 113 in response to an activation of activation signal 116, which may, in various embodiments, correspond to a determination that digital-to-analog converter circuit 114 is saturated. As used and defined herein, when a digital-to-analog converter circuit is saturated it refers to a condition when all of the bits for a series of digital words being converted by the digital-to-analog converter circuit have the same logical value. For example, the series of digital words could contain all logic-0 values or all logic-1 values. When this occurs, the digital-to-analog converter circuit output remains at a fixed value.

When a receiver circuit designed to support a lossy channel or communication link is used with a short channel or communication link that has relatively little loss, the equalization for a given symbol can be out-of-range of a digital-to-analog converter circuit included in the equalization circuit, resulting in the digital-to-analog converter circuit becoming saturated. In such cases, configuration of the decision feedback equalizer based on the error samples 111 may fail to converge to a correct stable condition, resulting in incorrect sampling results from recovery circuit 102.

By using dither signal 113 in the determination of feedback signal 115, it can allow the equalization to remain in range for the digital-to-analog converter circuit by allowing the variations in the symbols due to ISI to move over the entire dynamic range of the digital-to-analog converter circuit. In some cases, the magnitude of dither signal 113 may be greater than a difference between the magnitude of equalized signal 108 and a maximum error associated with equalizer circuit 103. As described below, dither circuit 104 may be implemented with an oscillator circuit that generates a sinusoidal signal for use as dither signal 113.

Figure 2:
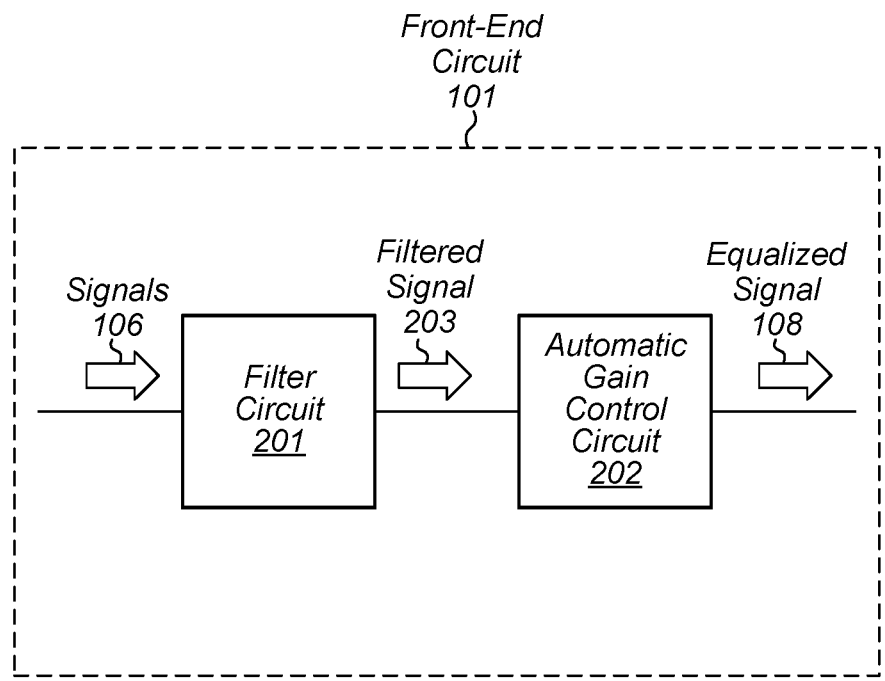
FIG. 2 is a block diagram of an embodiment of a front-end circuit for a receiver circuit.

As described above, front-end circuit 101 is configured to generate equalized signal 108. A block diagram of an embodiment of front-end circuit 101 is depicted in FIG. 2. As illustrated, front-end circuit 101 includes filter circuit 201 and automatic gain control circuit 202. It is noted that although front-end circuit 101 is depicted as being implemented using continuous-time linear equalization techniques, in other embodiments, other equalization techniques may be employed.

Filter circuit 201 is configured to generate filter signal 203 using signals 106. In various embodiments, to generate filter signal 203, filter circuit 201 may be further configured to attenuate high-frequency noise in signals 106. In some cases, filter circuit 201 may be further configured to attenuate low-frequency components at or near DC levels in signals 106.

In various embodiments, filter circuit 201 may be implemented using a series of filter circuits, each with different transfer functions. For example, filter circuit 201 may include three filter circuits. The first filter circuit may be a high-pass filter circuit, while the second and third filter circuits may be bandpass filter circuits. In some embodiments, filter circuit 201 may additionally include a variable gain amplifier circuit coupled to the output of the last of the three filter circuits.

Automatic gain control circuit 202 is configured to generate equalized signal 108 using filtered signal 203. In various embodiments, automatic gain control circuit 202 may be implemented as a closed-loop control circuit that uses feedback derived from equalized signal 108 to maintain the amplitude of the data symbols at an optimum level for sampling. In various embodiments, automatic gain control circuit 202 may include any suitable combination of attenuator and amplifier circuits that can be dynamically activated or de-activated to maintain the amplitude of the data symbols.

It is noted that although front-end circuit 101 is depicted as including filter circuit 201 and automatic gain control circuit 202, when different equalization techniques are employed, different and/or additional circuit blocks may be included.

Figure 3:
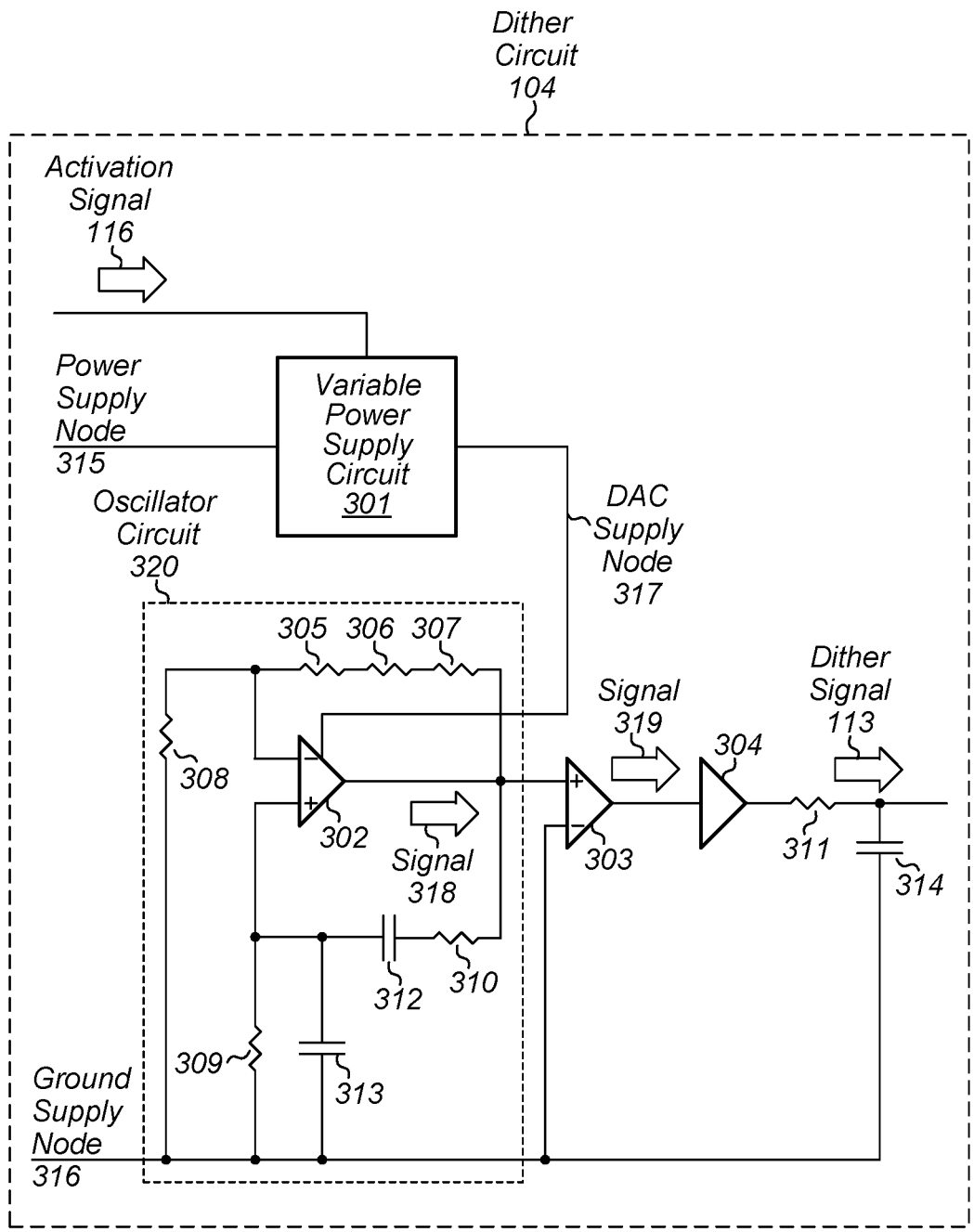
FIG. 3 is a block diagram of an embodiment of a dither circuit.

A block diagram of an embodiment of dither circuit 104 is depicted in FIG. 3. As illustrated, dither circuit 104 includes variable power supply circuit 301, oscillator circuit 320, amplifier circuit 303, buffer circuit 304, resistor 311, and capacitor 314. Oscillator circuit 320 includes amplifier circuit 302, resistors 305-310, and capacitors 312 and 313. In various embodiments, oscillator circuit 320 may be implemented using Wien-bridge oscillator circuit or any other suitable oscillator circuit topology.

Oscillator circuit 320 is configured to generate signal 318 based on a voltage level of DAC supply node 317. In various embodiments, an amplitude of signal 318 may be adjusted by varying the voltage level of DAC supply node 317, which is coupled to amplifier circuit 302.

In various embodiments, amplifier circuit 302 is implemented as a differential amplifier circuit with different circuit elements used in its positive feedback path and its negative feedback path. In the negative feedback path, resistors 305-307 are coupled between the output of amplifier circuit 302 and its negative input. Additionally, resistor 308 is coupled between the negative input of amplifier circuit 302 and ground supply node 316. It is noted that in some embodiments, diodes may be coupled in parallel with resistor 306 to assist in clamping the output of amplifier circuit 302.

Resistor 310 and capacitor 312 are coupled between the output of amplifier circuit 302 and its positive input. Additionally, resistor 309 and capacitor 313 are coupled between the positive input of amplifier circuit 302 and ground supply node 316.

The transfer function of the positive feedback path is given by Equation 1 where $V_o$ is the output voltage of amplifier circuit 302, $V_p$ is the voltage at the positive terminal of amplifier circuit 302, $C_{312}$ is the value of capacitor 312, $C_{313}$ is the value of capacitor 313, $R_{310}$ is the value of resistor 310, and $R_{309}$ is the value of resistor 309.

$$\frac{V_p}{V_o} = \frac{1}{1 + \frac{R_{310}}{R_{309}} + \frac{C_{313}}{C_{312}} + sR_{310}C_{313} + \frac{1}{sR_{309}C_{312}}} \quad (1)$$

In the case where $R_{309}=R_{310}=R$, $C_{312}=C_{313}=C$, and $s=j\omega$, Equation 1 can be simplified to what is depicted in Equation 2. The resonance frequency occurs when |F| is maximum, which occurs when $$\omega = \frac{1}{RC},$$

or when frequency $$f = \frac{\omega}{2\pi} = \frac{1}{2\pi RC}.$$

This implies that $$|F| = \frac{1}{3}$$

and has zero complex component at resonance.

$$F = \frac{V_p}{V_o} = \frac{1}{3 + j\left(\omega RC - \frac{1}{\omega RC}\right)} \quad (2)$$

The transfer characteristic for the negative feedback path is given in Equation 3, where is $R_{305}$ value of resistor 305, $R_{306}$ is the value of resistor 306, $R_{307}$ is the value of resistor 307, and $R_{308}$ is the value of resistor 308.

$$A = \frac{V_o}{V_n} = 1 + \frac{R_{305} + R_{306} + R_{307}}{R_{308}} \quad (3)$$

At steady state, |AF|=1 which implies that $$\frac{R_{305} + R_{306} + R_{307}}{R_{308}} = 2,$$

for the special condition of the positive feedback branch described above. To trigger startup of oscillator circuit 320, |AF|≥1. $R_{307}$ is variable, i.e., tunable to satisfy the startup condition.

It is noted that for the saturated digital-to-analog converter circuit application described above, a frequency range of dither signal 113 between hundreds of kilohertz to hundreds of megahertz may be desirable.

As noted above, the amplitude of signal 318 may be adjusted by changing the value of the voltage level on DAC supply node 317. Variable power supply circuit 301 is configured to generate a particular voltage level on DAC supply node 317 using a voltage level of power supply node 315. As described below, the voltage level of DAC supply node 317 may be adjusted based on various parameters, such as a number of errors detected in received data, electrical characteristics of the communication channel or link, and the like.

As described below, dither circuit 104 may be enabled by activation signal 116 in response to a detection of certain conditions regarding errors detected while recovering data from a serial data stream. To that end, variable power supply circuit 301 is also configured to allow DAC supply node 317 to float or couple DAC supply node 317 to ground supply node 316 in response to a de-activation of activation signal 116. By removing power to amplifier circuit 302, dither signal 113 can be de-activated. It is noted that this is one method of de-activating dither circuit 104, and other techniques to de-activate dither circuit 104 are possible and contemplated.

Amplifier circuit 303 is configured to amplify signal 318 to generate signal 319. In various embodiments, amplifier circuit 303 may use any suitable gain value including unity gain. Amplifier circuit 303 may, in various embodiments, be implemented using a differential amplifier circuit, or any other suitable amplifier circuit.

It is further noted that other waveforms types, besides sinusoidal, can be employed to compensate for a saturated digital-to-analog converter circuit 114. For example, a triangle wave can be generated using buffer circuit 304, resistor 311, and capacitor 314.

Buffer circuit 304 is configured to buffer signal 319. In various embodiments, buffer circuit 304 may be implemented as a Schmitt trigger circuit, or other suitable circuit whose output is a square wave. Resistor 311 and capacitor 314 are configured to convert such a square wave into a pseudo-triangle wave signal to generate dither signal 113. The values of resistor 311 and capacitor 314 may be selected to adjust the shape of dither signal 113. It is noted that buffer circuit 304, resistor 311, and capacitor 314 may, in various embodiments, be optional, and that signal 319 may be used directly by equalizer circuit 103.

Alternatively, a dither digital-to-analog converter circuit may be used to approximate triangular wave signals provided the least-significant-bit (LSB) voltage is small enough or sufficient filtering is added after the DAC. For example, a 1-bit DAC with an RC filter may produce an approximation of a triangle wave. to help fine tune negative feedback for the filtering algorithm, e.g., sign-sign least-mean-squares (SSLMS), used by equalizer circuit 103 to converge. In other embodiments, a clock or square wave signal may be employed provided its high and low phase amplitudes approximate the $H_0$ gap.

Resistors 305-311 may be implemented using polysilicon, aluminum, or any suitable material available on a semiconductor manufacturing process. It is noted that, in various embodiments, resistor 307 may be implemented as a variable resistor. Capacitors 312-314 may be implemented using a metal-oxide-metal (MOM) structure, a metal-insulator-metal (MIM) structure, or any other suitable capacitor structure available on a semiconductor manufacturing process.

Figure 4:
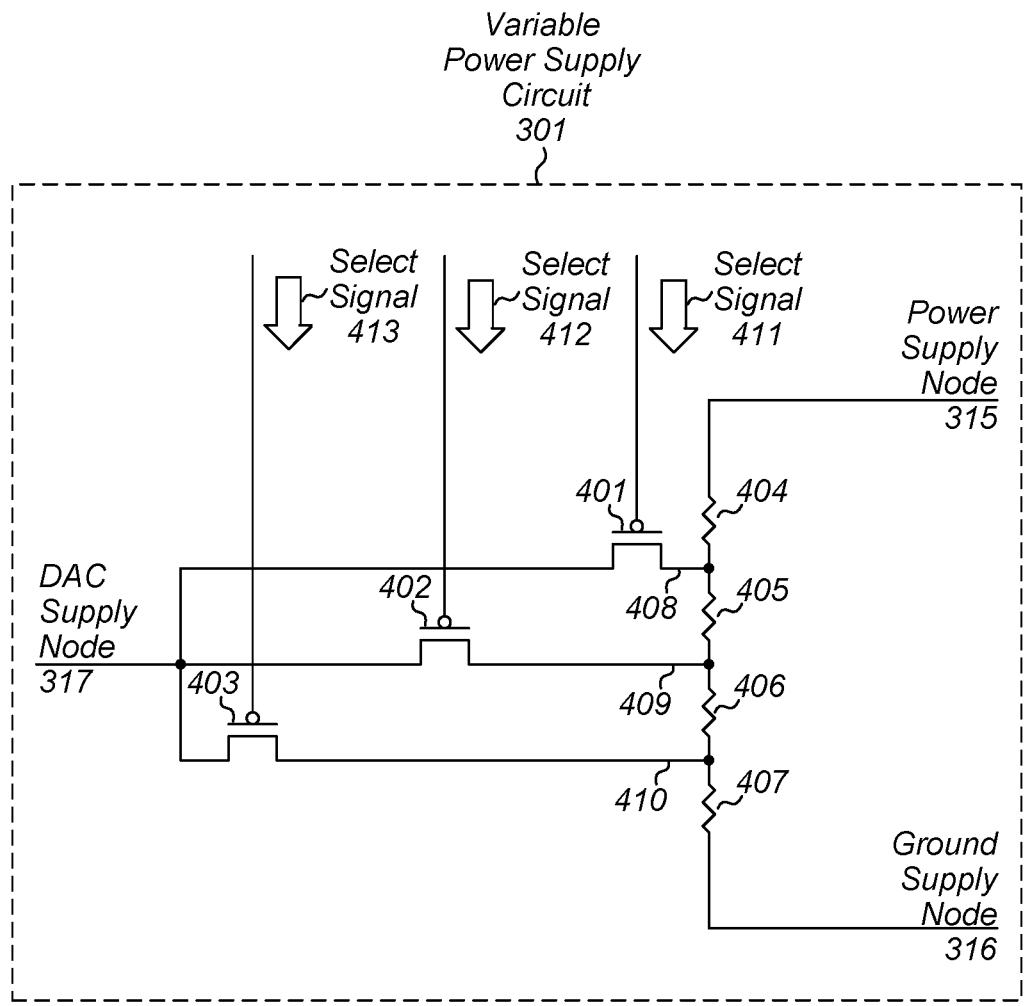
FIG. 4 is a block diagram of an embodiment of a variable power supply circuit.

Turning to FIG. 4, a block diagram of an embodiment of variable power supply circuit 301 is depicted. As illustrated, variable power supply circuit 301 includes devices 401-403, and resistors 404-407.

Resistors 404-407 are coupled, in series, between power supply node 315 and ground supply node 316. In various embodiments, resistors 404-407 operate a resistive voltage divider circuit with different voltage levels being present at nodes 408-410. In some embodiments, resistors 404-407 may have substantially the same values while, in other embodiments, each of resistors 404-407 may have different values. Values of resistors 404-407 may be selected based on a desired level of power supply voltage range for amplifier circuit 302.

Device 401 is coupled between node 408 and DAC supply node 317, and is controlled by select signal 411. In a similar fashion, devices 402 and 403 are coupled between DAC supply node 317 and nodes 409 and 410, respectively. Device 402 is controlled by select signal 412, and device 403 is controlled by select signal 413.

By activating a particular one of select signals 411-413, respective voltages of different ones of nodes 408-409 are coupled to DAC supply node 317. For example, when select signal 411 is activated, device 401 become active and node 408 is coupled to DAC supply node 317, resulting in the voltage level of DAC supply node 317 being substantially the same as the voltage level of node 408.

Respective values for select signals 411-413 may, in various embodiments, be set during a test phase for an integrated circuit that includes dither circuit 104. In other embodiments, a dedicated circuit may be included on the integrated circuit that includes dither circuit 104, where the dedicated circuit is configured to activate different ones of select signals 411-413 based on operating conditions of the integrated circuit such as power supply voltage, temperature, and the like.

As used and described herein, "activation" of a signal refers to changing a logical value of the signal from a value associated with an inactive state of a particular circuit or device, to a different value associated with an active state of the particular circuit or device. For example, in one embodiment, an activation of select signal 411 includes changing select signal 411 from a logic-1 value to a logic-0 value, thereby activating device 401.

In various embodiments, resistors 404-407 may be implemented using polysilicon, aluminum, or any other suitable material available on a semiconductor manufacturing process. Devices 401-403 may be implemented using p-channel metal-oxide semiconductor field-effect transistors (MOSFETs), fin field-effect transistors (FinFETs), gate-all-around field-effect transistors (GAAFETs), or any other suitable transconductance devices.

Although four resistors and three devices are depicted in the embodiment of FIG. 4, in other embodiments, any suitable number of resistors and devices may be employed. In some embodiments, the number of resistors and devices may be based on a desired level of granularity of the different voltage levels that can be present on DAC supply node 317.

Figure 5:
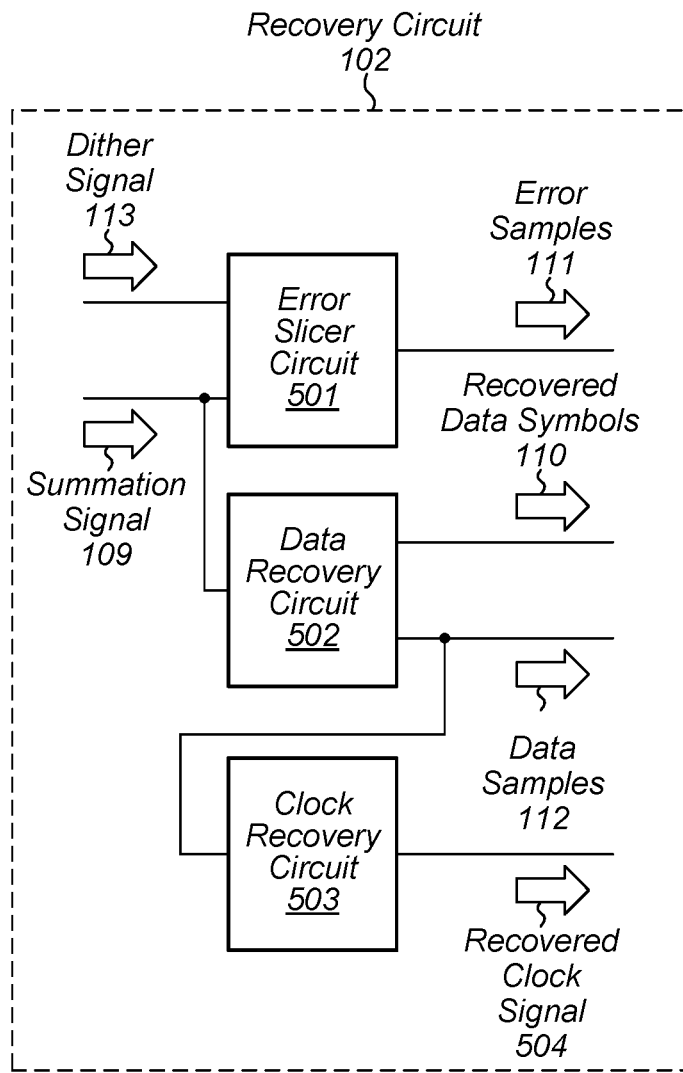
FIG. 5 is a block diagram of an embodiment of a recovery circuit.

Turning to FIG. 5, a block diagram of an embodiment of recovery circuit 102 is depicted. As illustrated, recovery circuit 102 includes error slicer circuit 501, data recovery circuit 502, and clock recovery circuit 503.

Error slicer circuit 501 is configured to generate error samples 111 using summation signal 109 and dither signal 113. In various embodiments, error slicer circuit 501 may be configured to combine summation signal 109 and dither signal 113, and sample the resultant combination using one or more error threshold voltages to generate error samples 111. In some cases, error slicer circuit 501 may sample the combination of summation signal 109 and dither signal 113 at times specified by recovered clock signal 504. In various embodiments, error slicer circuit 501 may be implemented using one or more comparator circuits coupled to corresponding latch or flip-flop circuits.

Data recovery circuit 502 is configured to generate data samples 112 and recovered data symbols 110 using summation signal 109. In some embodiments, data recovery circuit 502 may be configured to generate data samples 112 to generate recovered data symbols 110. Data recovery circuit 502 may, in some embodiments, sample summation signal 109 to generate data samples 112 using recovered clock signal 504 as a time reference. In some cases, data recovery circuit 502 may employ some back-end processing to select different ones of data samples 112 in order to determine a value for a given one of recovered data symbols 110. In various embodiments, data recovery circuit 502 may be implemented using one or more comparator circuits coupled to corresponding latch or flip-flop circuits, and a state machine or other suitable sequential logic circuit.

Clock recovery circuit 503 is configured to generate recovered clock signal 504 using data samples 112. In some embodiments, to generate recovered clock signal 504, clock recovery circuit 503 may adjust the frequency and/or phase of a periodic signal so that transitions in the periodic signal align to transitions in data samples 112. Various well-known techniques for aligning the transitions may be employed. In various embodiments, clock recovery circuit 502 may be implemented using a phase-locked loop circuit, a delay-locked loop circuit, or any other circuit configured to adjust the frequency and/or phase of a periodic signal.

Figure 6:
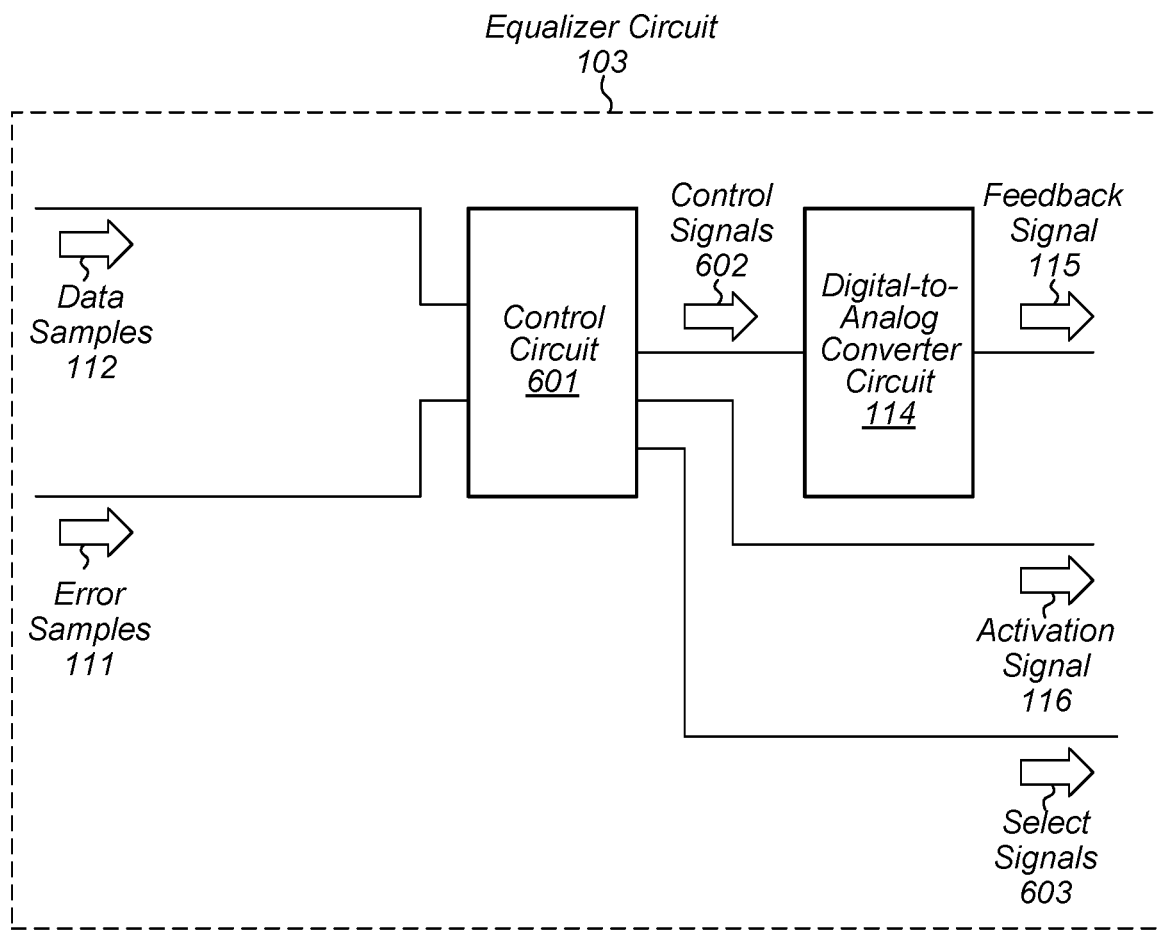
FIG. 6 is a block diagram of an embodiment of an equalizer circuit.

Turning to FIG. 6, a block diagram of an embodiment of equalizer circuit 103 is depicted. As illustrated, equalizer circuit 103 includes control circuit 601, and digital-to-analog converter circuit 114.

Control circuit 601 is configured to generate control signals 602, select signals 603, and activation signal 116 using data samples 112 and error samples 111. It is noted that, in various embodiments, select signals 603 may correspond to select signals 411-413 as depicted in FIG. 4. To generate control signals 602 and activation signal 116, control circuit 601 may, in some embodiments, perform one or more filter operations on data samples 112 and/or error samples 111. For example, control circuit 601 may employ an SSLMS filtering operation, or any other suitable filtering operation.

Using results of the filtering operation, control circuit 601 may be further configured to perform a DFE operation to generate control signals 602. In various embodiments, control circuit 601 may use a history of previously received data symbols to determine a value of control signals 602. According to the DFE algorithm, control circuit 601 may weight each of the previously received data symbols differently as values of control signals 602 are determined. It is noted that, in some embodiments, control signals 602 may correspond to multiple bits of a control word, with each bit activating or deactivating a corresponding stage in digital-to-analog converter circuit 114.

In various embodiments, control circuit 601 may perform a statistical analysis of respective signs of error samples 111 to determine whether or not digital-to-analog converter circuit 114 is saturated. In response to a determination that digital-to-analog converter circuit 114 is saturated, control circuit 601 may activate activation signal 116 to enable dither circuit 104. In various embodiments, control circuit 601 is configured to detect whether a number of positive errors of error samples 111 is balanced, i.e., equal, to a number of negative errors of error samples 111. In general, the DFE algorithm will be in a converged state when the number of positive errors and the number of negative errors are balanced. In response to the positive errors and negative errors becoming unbalanced, control circuit 601 is configured to activate activation signal 116, and when the positive and negative errors become balanced, control circuit 601 is configured to de-activate activation signal 116.

In addition to activating and de-activating dither circuit 104, control circuit 601 may be further configured to activate particular ones of select signals 603 based on the respective numbers of positive and negative errors. Depending on how unbalanced the positive and negative errors are, control circuit 601 is configured to activate different ones of select signals 603 in order to adjust the amplitude of dither signal 113. Additionally, some of select signals 603 may adjust values of one or more resistors in dither circuit 104 to adjust the shape, slope, frequency, and the like, of dither signal 113. In various embodiments, control circuit 601 may be implemented using any suitable combination of combinatorial and sequential logic circuits.

Digital-to-analog converter circuit 114 is configured to generate feedback signal 115 using control signals 602. In various embodiments, digital-to-analog converter circuit 114 may be implemented as a current steering digital-to-analog converter circuit, where each bit of control signals 602 activates a corresponding one of current sources coupled to a summation node where the currents are combined with equalized signal 108. In some cases, the different current sources may be weighted such that a most-significant bit of control signals 602 activates a current source that sources a larger current than a current source activated by a least-significant bit of control signals 602. It is noted that a current steering digital-to-analog circuit is but one way to implement digital-to-analog converter circuit 114, and that other types of digital-to-analog converter circuits are possible and contemplated.

Figure 7:
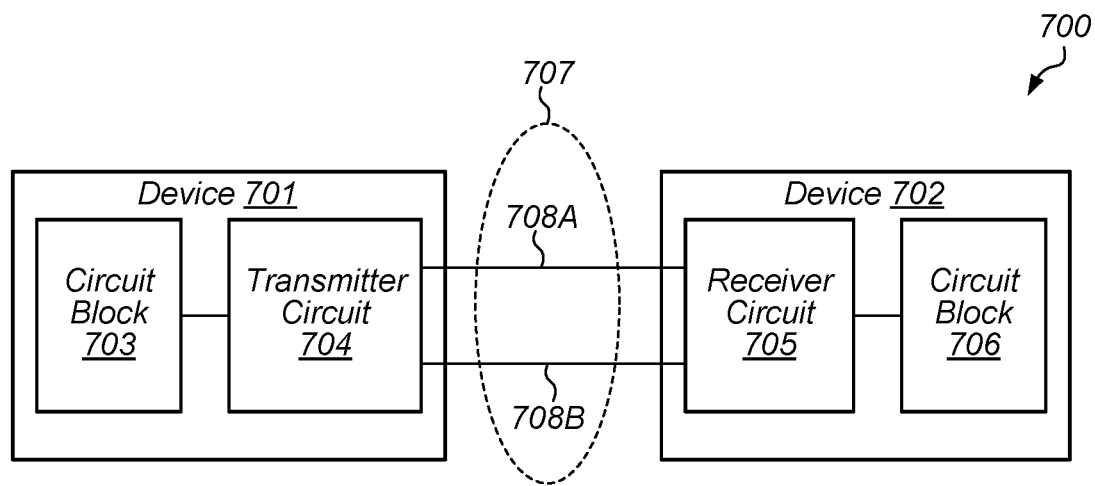
FIG. 7 is a block diagram of a computer system that includes a transmitter circuit and a receiver circuit.

As described above, a receiver circuit, such as receiver circuit 100, may be employed in a computer system. A block diagram of an embodiment of such a computer system is depicted in FIG. 7. As illustrated, computer system 700 includes devices 701 and 702, coupled by communication bus 707.

Device 701 includes circuit block 703 and transmitter circuit 704. In various embodiments, device 701 may be a processor circuit, a processor core, a memory circuit, or any other suitable circuit block that may be included on an integrated circuit in a computer system. It is noted that although device 701 only depicts a single circuit block and a single transmitter circuit, in other embodiments, additional circuit blocks and additional transmitter circuits may be employed.

Transmitter circuit 704 is configured to serially transmit signals, via communication bus 707, corresponding to data received from circuit block 703. Such signals may differentially encode one or more bits such that a difference between the respective voltage levels of wires 708A and 708B, at a particular point in time, correspond to a particular bit value. In some cases, the generation of the signals may include encoding the bits prior to transmission. It is noted that although communication bus 707 is depicted as including two wires, in other embodiments, any suitable number of wires may be employed.

Device 702 includes receiver circuit 705 and circuit block 706. Like device 701, device 702 may be a processor circuit, a processor core, a memory circuit, or any other suitable circuit block configured to receive data from transmitter circuit 704. In various embodiments, receiver circuit 705 may correspond to receiver circuit 100 as depicted in FIG. 1. In various embodiments, receiver circuit 705 may correspond to receiver circuit 100, and circuit 706 may include any suitable combination of processor circuits, memory circuits, and the like.

Devices 701 and 702 may, in some embodiments, be fabricated on a common integrated circuit. In other embodiments, devices 701 and 702 may be located on different integrated circuits mounted on a common substrate or circuit board. In such cases, communication bus 707 may include metal or other conductive traces on the substrate or circuit board. Although only two devices are depicted in computer system 700, in other embodiments, any suitable number of devices may be employed.

Figure 8:
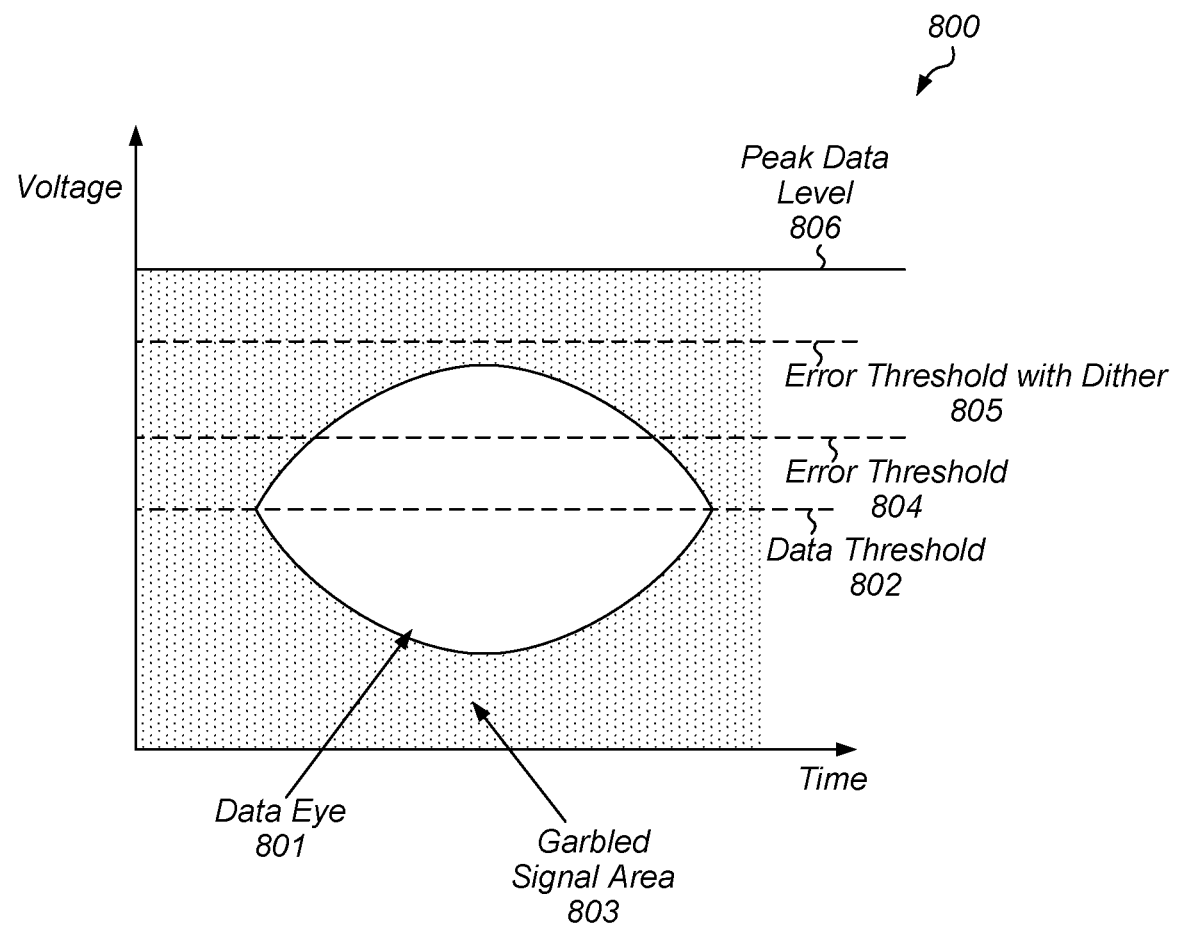
FIG. 8 illustrates a sample data eye for a serial data stream in a computer system.

Turning to FIG. 8, a sample data eye is illustrated. In various embodiments, data eye 801 may correspond to a data eye generated when data symbols 107 are transmitted to front-end circuit 103 via signals 106.

As illustrated, garbled signal area 803 corresponds to regions where respective levels of signals 106 are such that encoded symbols cannot be recovered. In various embodiments, garbled signal area 803 may be the result of electrical characteristics of a channel or bus through which signals 106 are transmitted. It is noted that garbled signal area 803 this contains information about the nature of these electrical characteristics, which can be used order better adapt the properties of equalizer circuit 103.

Values of signals 106 within data eye 801 are compared to data threshold 802 to determine values for data samples 112. As described above, data samples 112 can be further processed to generate recovered data symbols 110.

In addition to generating data samples 112 from values of signals 106 in data eye 801, error samples 111 are also generated by comparing the values of signals 106 to an error threshold (e.g., error threshold 804 and error threshold with dither 805). When the error threshold is located in garbled data region 803, error samples 111 can provide a useful measurement of the electrical characteristics of the channel or bus. As described above, when the height of data eye 801 is sufficiently large compare to peak data level 806, digital-to-analog converters (e.g., digital-to-analog converter circuit 114) may lack sufficient dynamic range to generate an error threshold large enough to generate desired error samples 111. As depicted, error threshold 804 is within data eye 801 resulting error samples 111 that are not captured within garbled signal area 803 and, therefore, do not accurately measure the electrical characteristics of the channel or bus.

As noted above, when the digital-to-analog converter circuits become saturated, dither signal 113 can be employed to increase the magnitude of error threshold. As illustrated, a magnitude of error threshold with dither 805 is greater than a magnitude of error threshold 804, allowing error samples 111 to be captured within the garbled signal area 803, allowing more accurate measurement of the electrical characteristics of the channel or bus, more optimal adaptation of equalizer circuit 103, and more samples of values of signals 106 within data eye 801 to be identified correctly.

It is noted that although only one set of error threshold values that are associated with the positive side of the data eye are depicted in FIG. 8, in other embodiments, another set of threshold values associated with the negative side of the data eye may be employed.

To summarize, various embodiments of a receiver circuit are disclosed. Broadly speaking, an apparatus is contemplated in which a front-end circuit may be configured to generate an equalized signal using a plurality of signals that encode a serial data stream including a plurality of data symbols, and a summer circuit configured to combine the equalized signal and a feedback signal to generate a summation signal. Additionally, a recovery circuit may be configured to sample the summation signal to generate a plurality of data samples, and sample a combination of the summation signal and a dither signal to generate a plurality of error samples. An equalizer circuit, which includes a digital-to-analog converter circuit, may be configured to generate the feedback signal using the plurality of data samples and the plurality of error samples. Moreover, a dither circuit may be configured to activate the dither signal in response to a determination that the digital-to-analog converter circuit is saturated.

Figure 9:
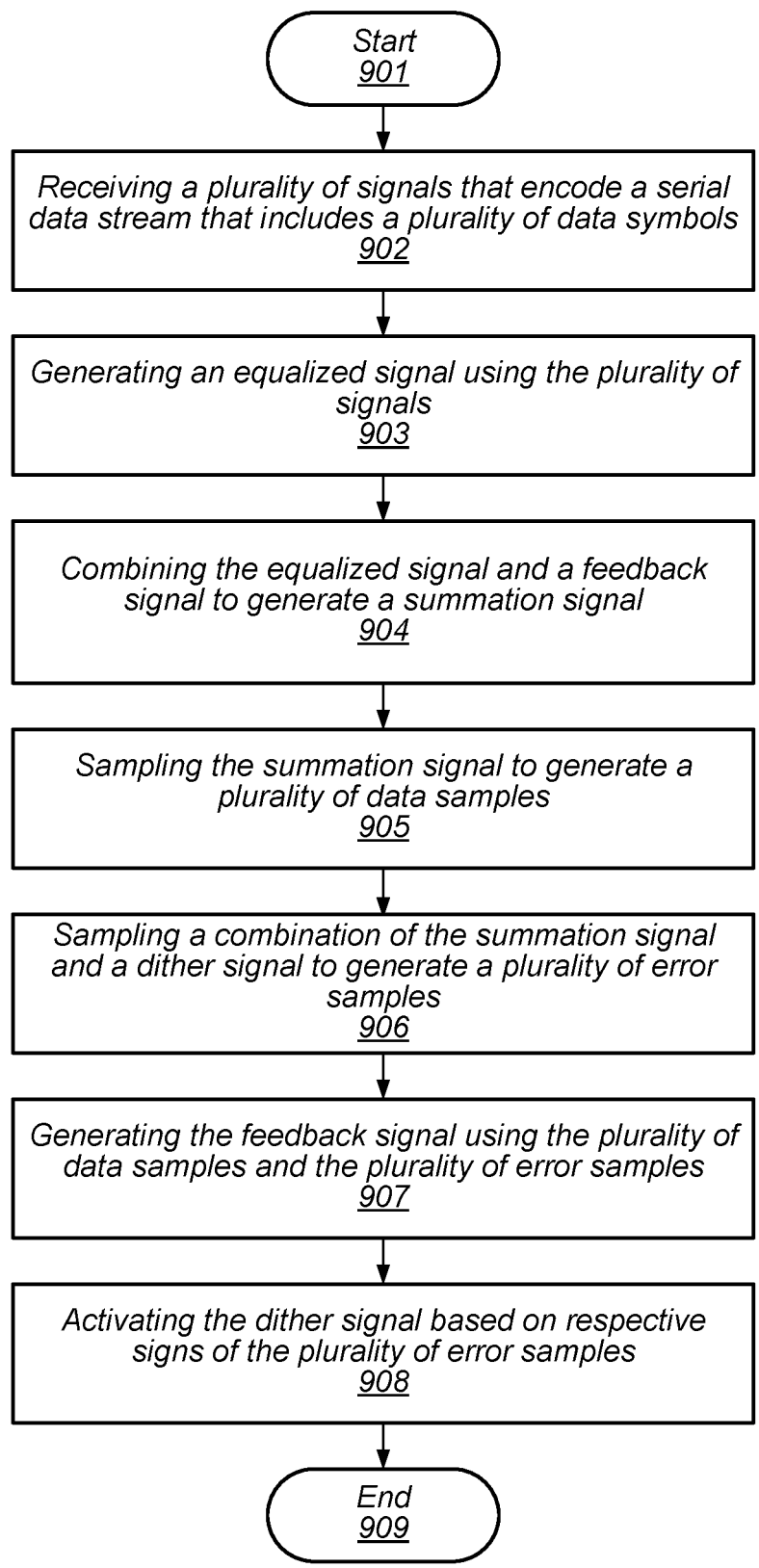
FIG. 9 is a flow diagram of an embodiment of a method for operating a serial data receiver circuit.

Turning to FIG. 9, a flow diagram depicting an embodiment of a method for operating a receiver circuit is illustrated. The method, which may be applied to various receiver circuits, such as receiver circuit 100, begins in block 901.

The method includes receiving a plurality of signals that encode a serial data stream that includes a plurality of data symbols (block 902). In some embodiments, a given data symbol of the plurality of data symbols encodes a plurality of bits.

The method further includes generating an equalized signal using the plurality of signals (block 903). In various embodiments, generating the equalized signal can include filtering the plurality of signals to generate a filtered signal, and adjusting a magnitude of the filtered signal to generate the equalized signal.

The method also includes combining the equalized signal and a feedback signal to generate a summation signal (block 904). In some embodiments, combining the equalized signal and the feedback signal includes sourcing or sinking, by a digital-to-analog converter circuit, one or more currents from a summation node through which the equalized signal is propagating.

The method further includes sampling the summation signal to generate a plurality of data samples (block 905). In various embodiments, the method further includes recovering a plurality of recovered data symbols using the plurality of data samples. The method also includes sampling a combination of the summation signal and a dither signal to generate a plurality of error samples (block 906).

The method also includes generating the feedback signal using the plurality of data samples and the plurality of error samples (block 907). In various embodiments, generating the feedback signal includes generating a plurality of weighted signals corresponding to a subset of previously received data symbols, and combining the plurality of weighted signals to generate the feedback signal.

The method further includes activating the dither signal based on respective signs of the plurality of error samples (block 908). The dither signal may, in various embodiments, include a sinusoidal signal. In some embodiments, activating the dither signal includes activating the dither signal in response to determining that a number of positive errors in the plurality of error samples is not balanced with a number of negative errors in the plurality of error samples.

In various embodiments, the method also includes modifying an amplitude of the dither signal based on the respective signs of the number of errors. The method concludes in block 909.

Figure 10:
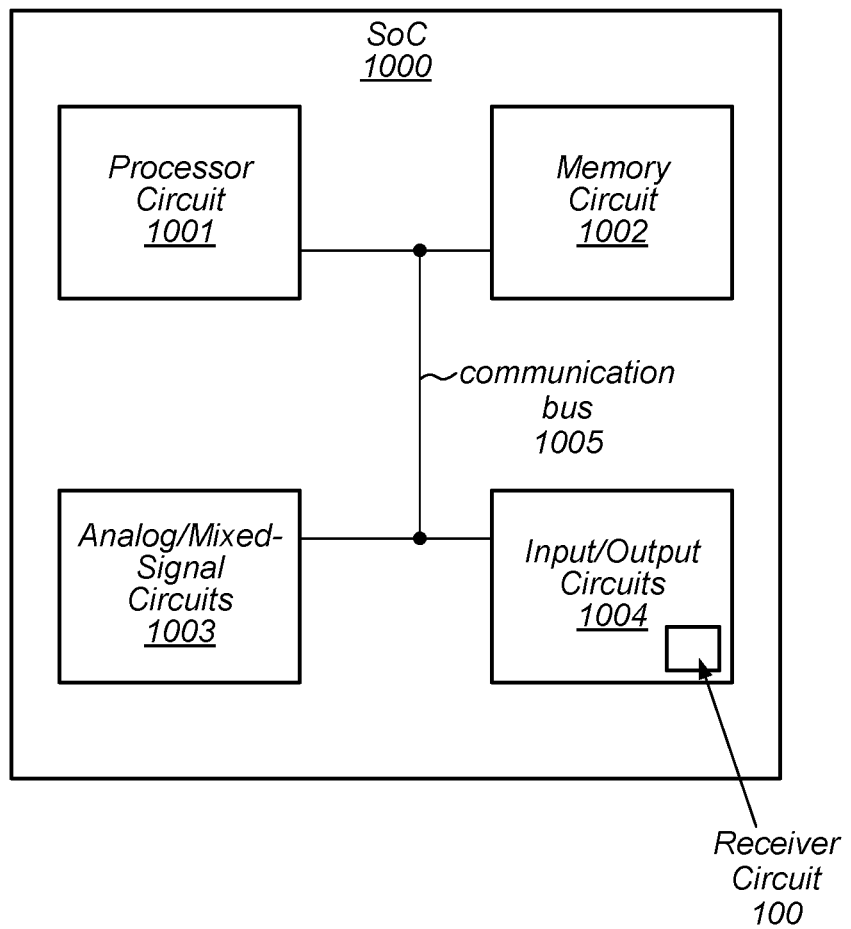
FIG. 10 is a block diagram of one embodiment of a system-on-a-chip that includes a receiver circuit.

A block diagram of a system-on-a-chip (SoC) is illustrated in FIG. 10. In the illustrated embodiment, SoC 1000 includes processor circuit 1001, memory circuit 1002, analog/mixed-signal circuits 1003, and input/output circuits 1004, each of which is coupled to communication bus 1005. In various embodiments, SoC 1000 may be configured for use in a desktop computer, server, or in a mobile computing application such as, e.g., a tablet, laptop computer, or wearable computing device.

Processor circuit 1001 may, in various embodiments, be representative of a general-purpose processor that performs computational operations. For example, processor circuit 1001 may be a central processing unit (CPU) such as a microprocessor, a microcontroller, an application-specific integrated circuit (ASIC), or a field-programmable gate array (FPGA).

Memory circuit 1002 may in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 10, in other embodiments, any suitable number of memory circuits may be employed.

Analog/mixed-signal circuits 1003 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 1003 may be configured to perform power management tasks with the inclusion of on-chip power supplies and voltage regulators.

Input/output circuits 1004 may be configured to coordinate data transfer between SoC 1000 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1004 may be configured to implement a version of Universal Serial Bus (USB) protocol or IEEE 1394 (Firewire®) protocol, and include receiver circuit 100 as depicted in the embodiment of FIG. 1.

Input/output circuits 1004 may also be configured to coordinate data transfer between SoC 1000 and one or more devices (e.g., other computing systems or integrated circuits) coupled to SoC 1000 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1004 may be configured to implement multiple discrete network interface ports.

Figure 11:
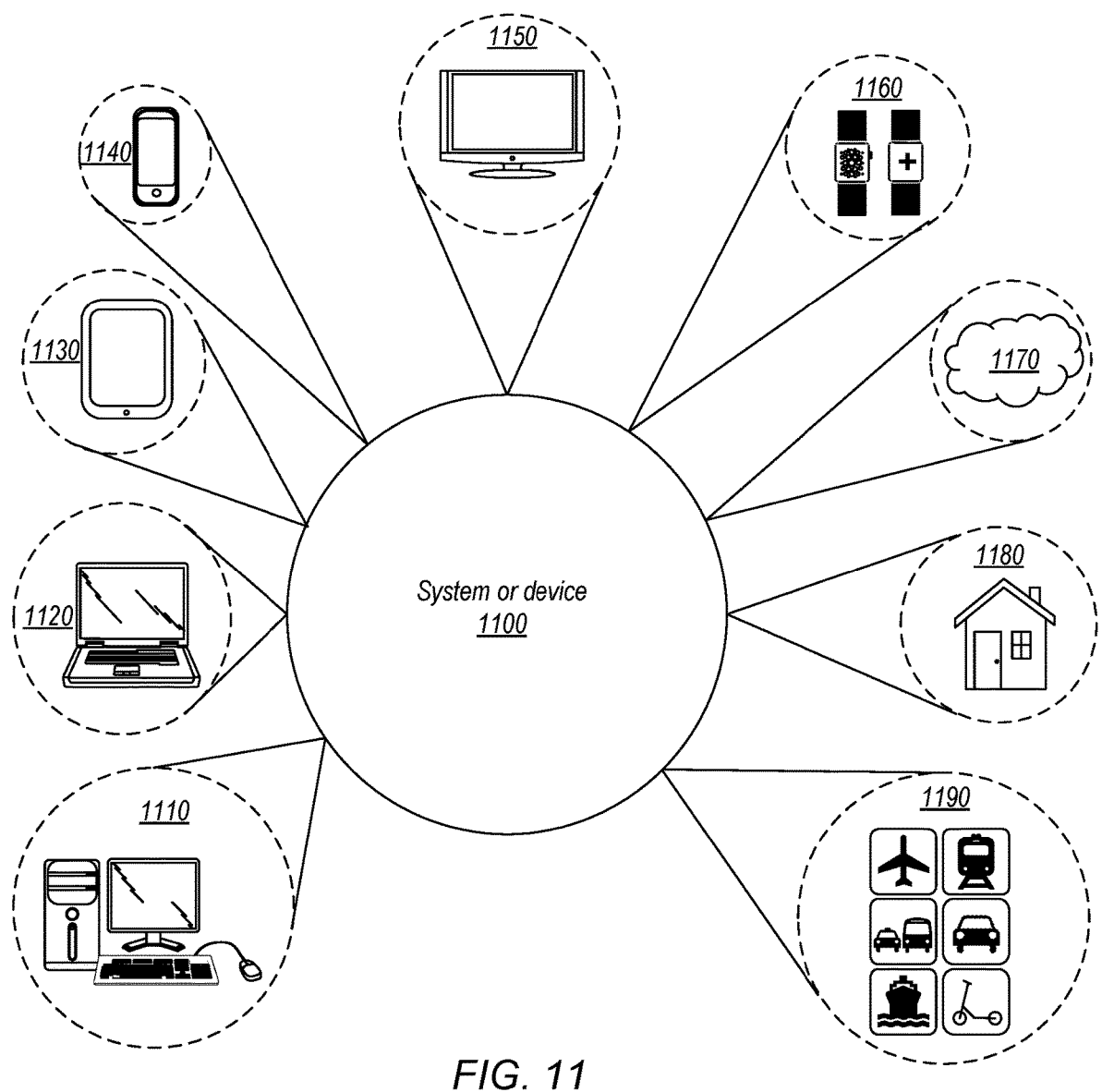
FIG. 11 is a block diagram of various embodiments of computer systems that may include receiver circuits.

Turning now to FIG. 11, various types of systems that may include any of the circuits, devices, or systems discussed above are illustrated. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1020, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Figure 12:
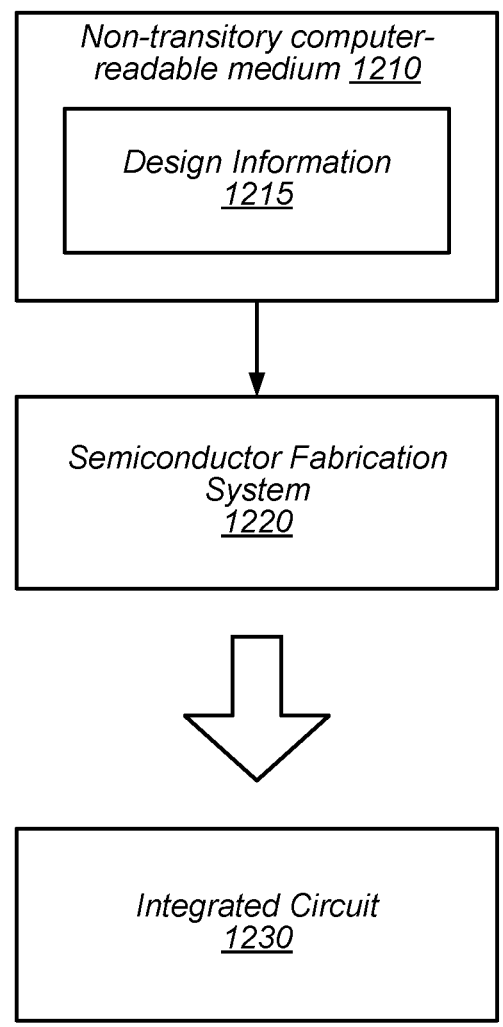
FIG. 12 illustrates an example of a non-transitory computer-readable storage medium that stores circuit design information.

FIG. 12 is a block diagram illustrating an example of a non-transitory computer-readable storage medium that stores circuit design information, according to some embodiments. In the illustrated embodiment, semiconductor fabrication system 1220 is configured to process design information 1215 stored on non-transitory computer-readable storage medium 1210 and fabricate integrated circuit 1230 based on design information 1215.

Non-transitory computer-readable storage medium 1210 may comprise any of various appropriate types of memory devices or storage devices. Non-transitory computer-readable storage medium 1210 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums, which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1120 to fabricate at least a portion of integrated circuit 1230. The format of design information 1215 may be recognized by at least one semiconductor fabrication system, such as semiconductor fabrication system 1220, for example. In some embodiments, design information 1115 may include a netlist that specifies elements of a cell library, as well as their connectivity. One or more cell libraries used during logic synthesis of circuits included in integrated circuit 1230 may also be included in design information 1215. Such cell libraries may include information indicative of device or transistor level netlists, mask design data, characterization data, and the like, of cells included in the cell library.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1130 may include any of various elements shown or described herein. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

\*\*\*

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

\*\*\*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(*f*) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
 a front-end circuit configured to generate an equalized signal using a plurality of signals that encode a serial data stream including a plurality of data symbols;
 a summer circuit configured to combine the equalized signal and a feedback signal to generate a summation signal;
 a recovery circuit configured to:
  sample the summation signal to generate a plurality of data samples; and
  sample a combination of the summation signal and a dither signal to generate a plurality of error samples;
 an equalizer circuit including a digital-to-analog converter circuit, wherein the equalizer circuit is configured to generate the feedback signal using the plurality of data samples and the plurality of error samples; and
 a dither circuit configured to activate the dither signal in response to a determination that the digital-to-analog converter circuit is saturated.

2. The apparatus of claim 1, wherein the dither circuit includes an oscillator circuit configured to generate a sinusoidal signal.

3. The apparatus of claim 2, wherein the dither circuit is further configured to generate a triangular wave signal using the sinusoidal signal, and wherein the dither signal includes the triangular wave signal.

4. The apparatus of claim 2, wherein the oscillator circuit includes an amplifier circuit coupled to a local power supply node, and wherein the dither circuit further includes a variable power supply circuit configured to generate a particular voltage on the local power supply node.

5. The apparatus of claim 4, wherein the variable power supply circuit is further configured to modify a voltage level of the local power supply node based on respective signs of the plurality of error samples.

6. The apparatus of claim 1, wherein the front-end circuit includes a filter circuit configured to filter the plurality of signals to generate a filtered signal, and wherein the front-end circuit further includes an automatic gain control circuit configured to amplify the filtered signal to generate the equalized signal.

7. A method, comprising:
 receiving a plurality of signals that encode a serial data stream that includes a plurality of data symbols;
 generating an equalized signal using the plurality of signals;
 combining the equalized signal and a feedback signal to generate a summation signal;
 sampling the summation signal to generate a plurality of data samples;
 sampling a combination of the summation signal and a dither signal to generate a plurality of error samples;
 generating the feedback signal using the plurality of data samples and the plurality of error samples; and
 activating the dither signal based on respective signs of the plurality of error samples.

8. The method of claim 7, further comprising recovering a plurality of recovered data symbols using the plurality of data samples.

9. The method of claim 8, wherein activating the dither signal includes activating the dither signal in response to determining a number of positive errors in the plurality of error samples is not balanced with a number of negative errors in the plurality of error samples.

10. The method of claim 9, further comprising modifying an amplitude of the dither signal based on the respective signs of the plurality of error samples.

11. The method of claim 9, further comprising modifying a frequency of the dither signal based on the respective signs of the plurality of error samples.

12. The method of claim 7, wherein the dither signal includes a sinusoidal signal.

13. The method of claim 7, wherein generating the equalized signal includes:
 filtering the plurality of signals to generate a filtered signal; and
 adjusting a magnitude of the filtered signal to generate the equalized signal.

14. An apparatus, comprising:
 a first device configured to transmit a plurality of signals on a communication channel, wherein the plurality of signals encode a serial data stream that includes a plurality of data symbols; and
 a second device coupled to the communication channel, wherein the second device is configured to:
  receive the plurality of signals;
  generate an equalized signal using the plurality of signals;
  combine the equalized signal and a feedback signal to generate a summation signal;
  sample the summation signal to generate a plurality of data samples;
  sample a combination of the summation signal and a dither signal to generate a plurality of error samples;
  generate the feedback signal using the plurality of data samples and the plurality of error samples; and
  activate the dither signal based on respective signs of the plurality of error samples.

15. The apparatus of claim 14, wherein the second device is further configured to recover a plurality of recovered data symbols using the plurality of data samples.

16. The apparatus of claim 15, wherein to activate the dither signal, the second device is further configured to activate the dither signal in response to determining a number of positive errors in the plurality of error samples is not balanced with a number of negative errors in the plurality of error samples.

17. The apparatus of claim 16, wherein the second device is further configured to modify an amplitude of the dither signal based on the respective signs of the plurality of error samples.

18. The apparatus of claim 16, wherein the second device is further configured to modify a frequency of the dither signal based on the respective signs of the plurality of error samples.

19. The apparatus of claim 14, wherein the dither signal includes a triangular wave signal.

20. The apparatus of claim 14, wherein to generate the equalized signal, the second device is further configured to:
   filter the plurality of signals to generate a filtered signal; and
   adjust a magnitude of the filtered signal to generate the equalized signal.

\* \* \* \* \*